US009308708B2

(12) United States Patent
Kleinow

(10) Patent No.: US 9,308,708 B2
(45) Date of Patent: Apr. 12, 2016

(54) PROCESS FOR PRODUCING CERAMIC COMPOSITE COMPONENTS

(75) Inventor: Chad Daniel Kleinow, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 13/459,436

(22) Filed: Apr. 30, 2012

(65) Prior Publication Data

US 2013/0251939 A1 Sep. 26, 2013

Related U.S. Application Data

(60) Provisional application No. 61/615,074, filed on Mar. 23, 2012.

(51) Int. Cl.
*B32B 37/00* (2006.01)
*B32B 18/00* (2006.01)
*F01D 5/28* (2006.01)

(52) U.S. Cl.
CPC ............... *B32B 18/00* (2013.01); *F01D 5/282* (2013.01); *F01D 5/284* (2013.01); *C04B 2235/658* (2013.01); *C04B 2235/6581* (2013.01); *C04B 2237/343* (2013.01); *C04B 2237/365* (2013.01); *C04B 2237/368* (2013.01); *C04B 2237/38* (2013.01); *C04B 2237/60* (2013.01); *C04B 2237/61* (2013.01); *C04B 2237/76* (2013.01); *C04B 2237/86* (2013.01);
(Continued)

(58) Field of Classification Search
CPC ........... F01D 5/14; F01D 5/282; F01D 5/147; F01D 5/284; B32B 3/04; B32B 18/00; B29C 70/24

USPC ........ 156/222, 226, 227, 307.1, 307.7, 89.11, 156/329; 416/229 R, 230, 229 A; 29/889.71; 415/181
See application file for complete search history.

(56) References Cited

U.S. PATENT DOCUMENTS 4,564,543 A * 1/1986 Ritter .............................. 428/58
5,015,540 A 5/1991 Borom et al.
(Continued)

FOREIGN PATENT DOCUMENTS

CN 1955144 A 5/2007
EP 0556088 A1 8/1993
(Continued)

OTHER PUBLICATIONS

Search Report and Written Opinion from PCT/US2013/031899 dated Dec. 20, 2013.
(Continued)

*Primary Examiner* — John Goff
(74) *Attorney, Agent, or Firm* — General Electric Company; Brian P. Overbeck

(57) ABSTRACT

A process for producing components containing ceramic materials. The process entails forming a first region of a component with plies containing a reinforcement material in a precursor of a ceramic material. The plies include at least a first set of plies between at least second and third sets of plies. Distal portions of the second and third sets of plies are then folded away from the first set of plies so that they are oriented transverse to the first set of plies. A fourth set of plies is then interleaved among the folded distal portions of the second and third sets of plies.

22 Claims, 4 Drawing Sheets

(52) U.S. Cl.
CPC ...... *F05D 2300/6033* (2013.01); *Y02T 50/672* (2013.01); *Y10T 428/2419* (2015.01)

(56) References Cited

U.S. PATENT DOCUMENTS

| | | | |
|---|---|---|---|
| 5,330,854 | A | 7/1994 | Singh et al. |
| 5,336,350 | A | 8/1994 | Singh |
| 5,429,853 | A | 7/1995 | Darrieux |
| 5,628,938 | A | 5/1997 | Sangeeta et al. |
| 6,024,898 | A | 2/2000 | Steibel et al. |
| 6,258,737 | B1 | 7/2001 | Steibel et al. |
| 6,403,158 | B1 | 6/2002 | Corman |
| 6,503,441 | B2 | 1/2003 | Corman et al. |
| 6,676,373 | B2 * | 1/2004 | Marlin et al. ............... 415/191 |
| 7,393,182 | B2 | 7/2008 | Matheny |
| 7,510,379 | B2 * | 3/2009 | Marusko et al. ............ 416/230 |
| 7,708,851 | B2 | 5/2010 | Corman et al. |
| 2004/0067316 | A1 | 4/2004 | Gray et al. |
| 2011/0027098 | A1 * | 2/2011 | Noe et al. ................. 416/241 B |
| 2011/0293828 | A1 | 12/2011 | Eberling-Fux et al. |
| 2011/0299976 | A1 * | 12/2011 | Uskert ....................... 415/173.1 |

FOREIGN PATENT DOCUMENTS

| | | |
|---|---|---|
| EP | 640464 A2 * | 3/1995 |
| EP | 2006074 A1 | 12/2008 |
| EP | 2363574 A2 | 9/2011 |

OTHER PUBLICATIONS

Unofficial English Translation of Chinese Office Action issued in connection with corresponding CN Application No. 201380015742.5 on Apr. 7, 2015.

* cited by examiner

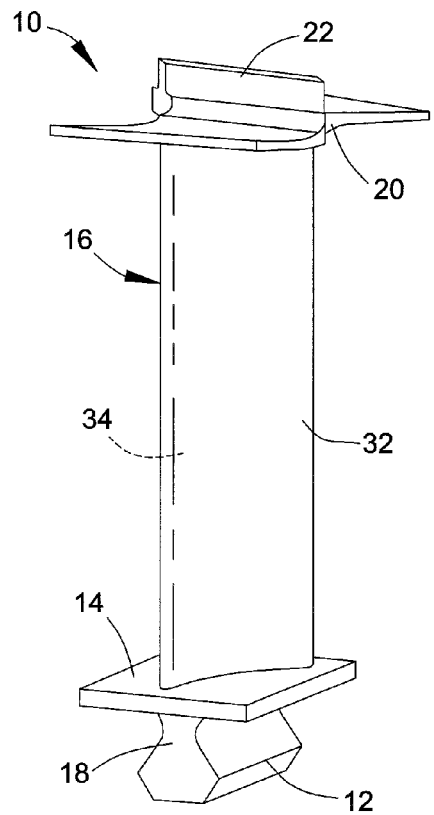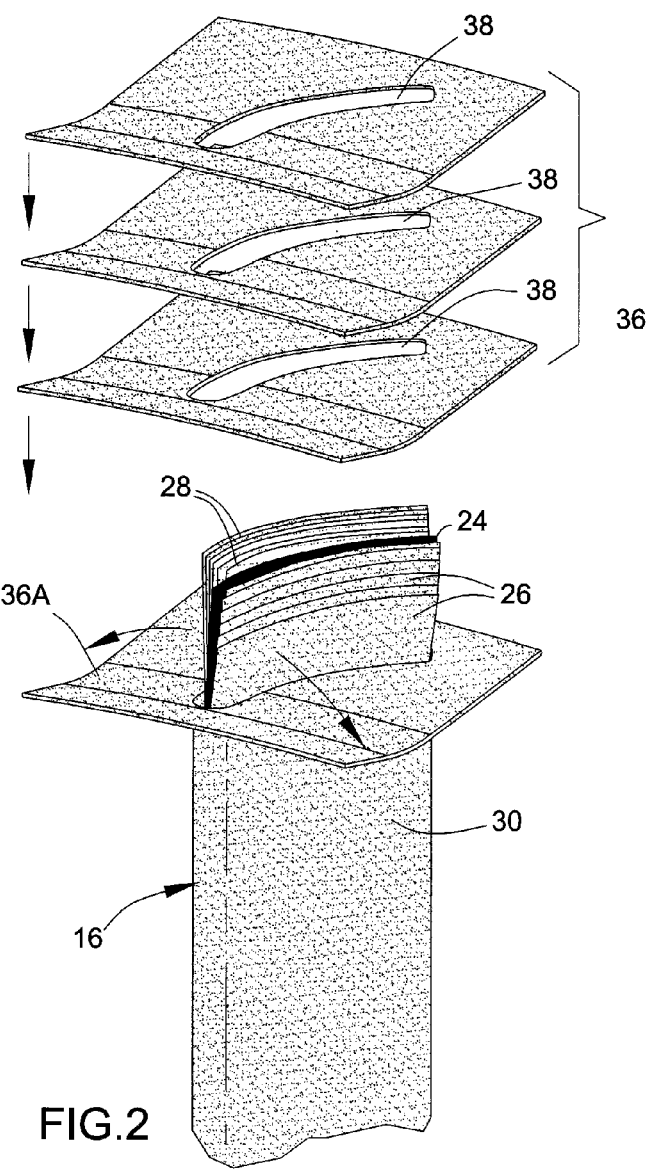
FIG.1
FIG.2

PROCESS FOR PRODUCING CERAMIC COMPOSITE COMPONENTS

This application claims the benefit of U.S. Provisional Application No. 61/615,074, filed Mar. 23, 2012, the contents of which are incorporated herein by reference.

BACKGROUND OF THE INVENTION

The present invention generally relates to ceramic-based articles and processes for their production. More particularly, this invention is directed to processes of producing ceramic matrix composite (CMC) components having detailed features, for example, a tip shroud of a turbine airfoil component.

Higher operating temperatures for gas turbines are continuously sought in order to increase their efficiency. Though advances in Nickel-based superalloys have allowed turbines to operate at these higher temperatures, a step change in capability exists in alternative materials currently being investigated. Ceramic materials are a notable example because their high temperature capabilities can significantly reduce cooling air requirements. As used herein, ceramic-based materials encompass homogeneous ceramic materials as well as ceramic matrix composite (CMC) materials. CMC materials generally comprise a ceramic fiber reinforcement material embedded in a ceramic matrix material. The reinforcement material may be discontinuous short fibers dispersed in the matrix material or continuous fibers or fiber bundles oriented within the matrix material. The reinforcement material serves as the load-bearing constituent of the CMC in the event of a matrix crack. In turn, the ceramic matrix protects the reinforcement material, maintains the orientation of its fibers, and serves to dissipate loads to the reinforcement material. Silicon-based composites, such as silicon carbide (SiC) as the matrix and/or reinforcement material, are of particular interest to high-temperature applications, for example, high-temperature components of gas turbines including aircraft gas turbine engines and land-based gas turbine engines used in the power-generating industry. Continuous fiber reinforced ceramic composites (CFCC) are a particular type of CMC that offers light weight, high strength, and high stiffness for a variety of high temperature load-bearing applications, including shrouds, combustor liners, vanes (nozzles), blades (buckets), and other high-temperature components of gas turbines. A notable example of a CFCC material developed by the General Electric Company under the name HiPerComp® contains continuous silicon carbide fibers in a matrix of silicon carbide and elemental silicon or a silicon alloy.

Examples of CMC materials and particularly SiC/Si-SiC (fiber/matrix) CFCC materials and processes are disclosed in U.S. Pat. Nos. 5,015,540, 5,330,854, 5,336,350, 5,628,938, 6,024,898, 6,258,737, 6,403,158, and 6,503,441, and U.S. Patent Application Publication No. 2004/0067316. One such process is known as "prepreg" melt-infiltration (MI), which in general terms entails the fabrication of CMCs using multiple prepreg layers, each in the form of a tape-like structure comprising the desired reinforcement material, a precursor of the CMC matrix material, and one or more binders.

For purposes of discussion, a low pressure turbine (LPT) blade 10 of a gas turbine engine is represented in FIG. 1. The blade 10 is an example of a component that can be produced from a ceramic-based material, including CMC materials. The blade 10 is generally represented as being of a known type and adapted for mounting to a disk or rotor (not shown) within the turbine section of an aircraft gas turbine engine. For this reason, the blade 10 is represented as including a dovetail 12 for anchoring the blade 10 to a turbine disk by interlocking with a complementary dovetail slot formed in the circumference of the disk. As represented in FIG. 1, the interlocking features comprise protrusions referred to as tangs that engage recesses defined by the dovetail slot, though other interlocking features can be used. The blade 10 is further shown as having a platform 14 that separates an airfoil 16 from a shank 18 on which the dovetail 12 is defined. The blade 10 is further equipped with a blade tip shroud 20 which, in combination with tip shrouds of adjacent blades within the same stage, defines a band around the blades that is capable of reducing blade vibrations and improving airflow characteristics. By incorporating a seal tooth 22, the blade tip shroud 20 is further capable of increasing the efficiency of the turbine by reducing combustion gas leakage between the blade 10 and a shroud surrounding the blade tip. The tip shroud 20 has very demanding material requirements because it is directly subjected to hot combustion gases during operation of the engine and high centrifugal loading.

Current state-of-the-art approaches for fabricating ceramic-based turbine blades have involved integrating the dovetail 12, platform 14, airfoil 16 and tip shroud 20 as one piece during the manufacturing process, much like conventional investment casting techniques currently used to make metallic blades. However, the tip shroud 20 (along with the dovetail 12 and platform 14) represents a detailed geometric feature of the blade 10 that poses substantial challenges to designing, manufacturing and integrating CMC components into an affordable, producible design for turbine applications. For example, the process of integrating the tip shroud 20 with the airfoil 16 using CMC materials creates complexities in the design and manufacturing process, and can result in a process that can be too expensive to be economically practical. Furthermore, the low strain-to-failure capabilities of typical CMC materials pose additional challenges to implementing CMC materials in shrouded blade designs.

BRIEF DESCRIPTION OF THE INVENTION

The present invention provides a process for producing components containing ceramic materials, in which detailed geometric features of the components are also formed of ceramic materials to yield fully integrated and robust components.

According to a first aspect of the invention, a process is provided that entails producing a component comprising a first region, and at least a second region having at least one off-axis geometric feature that results in the second region having a more complex geometry than the first region. The process includes forming the first region of the component with plies containing a reinforcement material in a precursor of a ceramic material. The plies comprising at least a first set of plies between at least second and third sets of plies. Distal portions of the second and third sets of plies are then folded away from the first set of plies so that the folded distal portions of each of the second and third sets of plies are oriented transverse to the first set of plies within the first region of the component. Furthermore, plies of a fourth set of plies are interleaved among folded distal portions of the second set of plies and among folded distal portions of the third set of plies. Thereafter, the first, second, third, and fourth sets of plies are consolidated and cured so that the first set of plies and portions of the second and third sets of plies that were not folded define the first region of the component, and so that the folded distal portions of the second and third sets of plies define the second region of the component.

According to a preferred aspect of the invention, a component produced by the process described above may be, as a nonlimiting example, an airfoil component of a gas turbine.

According to another aspect of the invention, a process is provided that entails producing a turbine blade comprising an airfoil, a tip shroud, and at least a seal tooth, the tip shroud having at least one off-axis geometric feature that results in the tip shroud having a more complex geometry than the airfoil. The process includes forming the airfoil of the turbine blade with plies containing a reinforcement material in a precursor of a ceramic material. The plies comprising at least a first set of plies between at least second and third sets of plies. Distal portions of the second and third sets of plies are then folded away from the first set of plies so that the folded distal portions of each of the second and third sets of plies are oriented transverse to the first set of plies within the airfoil of the turbine blade. Furthermore, plies of a fourth set of plies are interleaved among folded distal portions of the second set of plies and among folded distal portions of the third set of plies. At least the seal tooth of the turbine blade is formed with a fifth set of plies containing reinforcement material in a precursor of a ceramic material. The fifth set of plies is applied to a surface defined by the folded distal portions of the second and third sets of plies and the fourth set of plies interleaved therewith. Furthermore, the fifth set of plies is folded to have first portions that overlie the folded distal portions of each of the second and third sets of plies and to have second portions that are aligned with the airfoil and oriented transverse to the folded distal portions of the second and third sets of plies. Thereafter, the first, second, third, fourth, and fifth sets of plies are consolidated and cured so that the first set of plies and portions of the second and third sets of plies that were not folded define the airfoil of the turbine blade, and so that the folded distal portions of the second and third sets of plies define the tip shroud of the turbine blade, and so that the fifth set of plies define the seal tooth of the turbine blade.

A technical effect of this invention is the ability to produce CMC components having integrally-formed detailed geometric features, such as a tip shroud of a CMC turbine blade whose advantages include added strength capability and effective load transfer.

Other aspects and advantages of this invention will be better appreciated from the following detailed description.

BRIEF DESCRIPTION OF THE DRAWINGS

FIG. 1 is a perspective view schematically representing a turbine blade of a type that can be formed of a CMC material in accordance with embodiments of the present invention.

FIG. 2 is a perspective view schematically representing the tip region of a turbine blade (such as that of FIG. 1), and represents the fabrication of an airfoil and integral tip shroud of the blade from prepreg plies in accordance with an embodiment of the present invention.

DETAILED DESCRIPTION OF THE INVENTION

Figure 3:
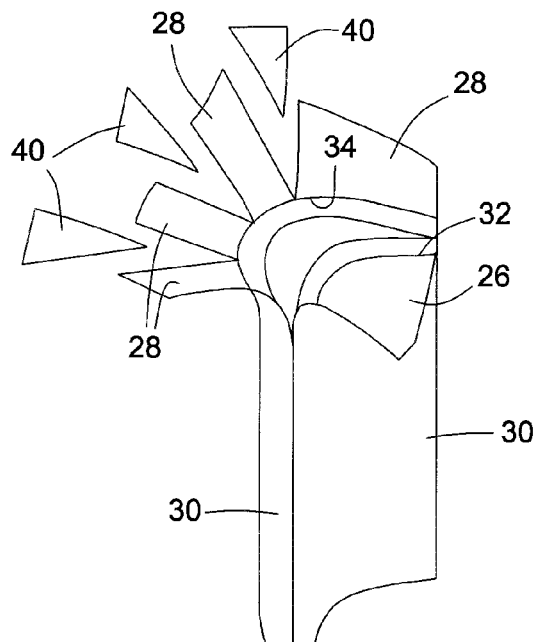
FIGS. 3 and 4 are perspective views similar to FIG. 2 but with interior prepreg plies omitted to better illustrate initial steps performed during the fabrication of the integral tip shroud in accordance with a preferred aspect of the invention.

The present invention will be described in terms of processes for producing components that contain CMC materials and have one or more detailed geometric features. While various applications are foreseeable and possible, applications of particular interest include high temperature applications, for example, components of gas turbines, including land-based and aircraft gas turbine engines. Of particular interest are CMC turbine blades that incorporate a tip shroud, for which the blade 10 of FIG. 1 will serve as an example in the following discussion. While the invention is applicable to a wide variety of ceramic-based materials, ceramic-based materials of particular interest to the invention are believed to be CMC materials containing silicon, such as CMC's containing silicon carbide as the reinforcement and/or matrix material, for example, continuous silicon carbide fibers in a matrix of silicon carbide. However, other ceramic-based materials are also within the scope of the invention, nonlimiting examples of which include fibers and reinforcement materials formed of titanium carbide (TiC), silicon nitride ($Si_3N_4$), and/or alumina ($Al_2O_3$).

As known in the art, the airfoil 16 of the blade 10 is an excellent candidate for being produced from a ceramic-based material, and especially a CMC material, because it is directly exposed to the hot combustion gases and has a generally linear geometry. On the other hand, the tip shroud 20 has a more complex geometry, in the sense that the airfoil 16 has a generally linear geometry along its dominant span-wise axis, whereas the tip shroud 20 defines geometric features oriented transverse to the span-wise direction of the blade 10. Furthermore, the off-axis geometric features of the shroud 20 are subjected to high mechanical loading during operation of the engine, and therefore require structural interface capabilities that pose substantial challenges to designing, manufacturing and integrating a blade 10 formed entirely of a CMC material. The present invention provides a process for taking advantage of the high-temperature capabilities of CMC materials, while addressing the difficulties of producing complicated geometries from CMC materials. In particular, a preferred aspect of the present invention is the ability to produce the tip shroud 20 with prepreg layers that also form at least part of the airfoil 16, such that the tip shroud 20 is a fully integrated part of the airfoil 16 and with the airfoil 16 defines a unitary part.

The unitary airfoil 16 and tip shroud 20 can be fabricated from ceramic-based materials produced using known processes, for example, with the use of prepregs. As a particular example, the unitary airfoil 16 and shroud 20 can be fabricated by the previously-described prepreg melt-infiltration (MI) process, wherein multiple prepregs are formed to contain one or more desired reinforcement materials and a precursor of the CMC matrix material, as well as one or more binders. The prepregs undergo lay-up, are debulked and cured while subjected to elevated pressures and temperatures, and may undergo various other processing steps to form a laminate preform. Thereafter, the laminate preform may be heated (fired) in a vacuum or an inert atmosphere to decompose the binders and produce a porous preform, which can then be melt infiltrated. If the CMC material comprises a silicon carbide reinforcement material in a ceramic matrix of silicon carbide (a SiC/SiC CMC material), molten silicon is typically used to infiltrate the porosity, react with a carbon constituent (carbon, carbon source, or carbon char) within the matrix to form silicon carbide, and fill the porosity. However, it will be apparent from the following discussion that the invention also applies to other types and combinations of CMC materials. Furthermore, it is foreseeable that the unitary airfoil 16 and shroud 20 could be fabricated with the use of materials other than prepregs, for example, plies of reinforcement material that are infiltrated after being laid-up.

Because of the generally linear geometry of the airfoil 16, the initial lay-up process is not particularly complex. According to a preferred aspect of the invention, fabrication of the tip shroud 20 entails additional steps that make use of the prepregs that define the linear geometry of the airfoil 16. FIG. 2 represents an example of a blade tip region of the blade airfoil 16 during its fabrication, which according to a preferred aspect of the invention can be entirely formed of a CMC material and produced by a CMC process as described above. As represented, the airfoil 16 and tip shroud 20 are fabricated from multiple prepreg plies. FIG. 2 represents a first set of prepreg plies 24 as being centrally located within the airfoil 16, and for convenience will be referred to as the core plies 24. Two additional sets of plies 26 and 28 are represented as being on opposite sides of the core plies 24, generally situated on the concave (pressure) and convex (suction) sides of the airfoil 16, respectively. Finally, the airfoil 16 includes one or more plies 30 that overlie the plies 26 and 28 to define the concave and convex surfaces 32 and 34 of the airfoil 16. Whereas each of the interior plies 24, 26 and 28 preferably contains the desired reinforcement material and a suitable precursor of the desired ceramic matrix material, the additional plies 30 preferably do not contain reinforcement material. Encasing the reinforcement-containing plies 24, 26 and 28 with the reinforcement-free plies 30 serves to avoid the exposure of reinforcement fibers at the surfaces of the airfoil 16 at the completion of the fabrication process.

It should be appreciated that various numbers of prepreg plies 24, 26, 28 and 30 could be incorporated into the construction of the airfoil 16 of the blade 10. As represented in FIG. 2, roughly equal numbers of prepreg plies make up the sets of plies 26 and 28. To build up a suitable thickness for the airfoil 16 while achieving its uniformly contoured concave and convex surfaces 32 and 34, the plies 26 and 28 are represented as having roughly equal span-wise lengths and roughly equal chord-wise widths, though it should be understood that their lengths and widths could vary, for example, as a result of increasing or decreasing in length and/or width to yield what may be referred to as a stepped formation facing or facing away from the core plies 24. Accordingly, shapes and sizes of the plies 24, 26 and 28 other than the particular shapes and sizes represented in FIG. 2 are foreseeable and within the scope of the invention.

As further represented in FIG. 2, only the plies 24, 26 and 28 extend into the tip region of the blade 10, and these plies 24, 26 and 28 are assembled with additional prepreg plies 36 to produce the tip shroud 20. Each of the plies 36, hereinafter referred to as insert plies 36, preferably contains a reinforcement material and a suitable precursor for a desired ceramic matrix material. The reinforcement material and ceramic matrix material of the insert plies 36 are preferably, though not necessarily, the same as those for the plies 24, 26 and 28. As will be discussed in more detail with reference to FIG. 5, the insert plies 36 are preferably assembled in an interleaving manner with the plies 26 and 28 during the process of fabricating the shroud 20. In particular, the plies 26 and 28 are individually folded and/or folded in groups of limited numbers in opposite directions away from the core plies 24 so that the folded plies 26 and 28 are oriented transverse to the span-wise direction of the airfoil 16, and the insert plies 36 are individually assembled or assembled in groups of limited numbers with the folded plies 26 and 28. For purposes of their assembly with the plies 26 and 28, each insert ply 36 can be formed to have a central opening 38 corresponding in size and shape to the outer peripheral shape defined by at least the core plies 24 and, in some circumstances, also the plies 26 and 28.

Figure 4:
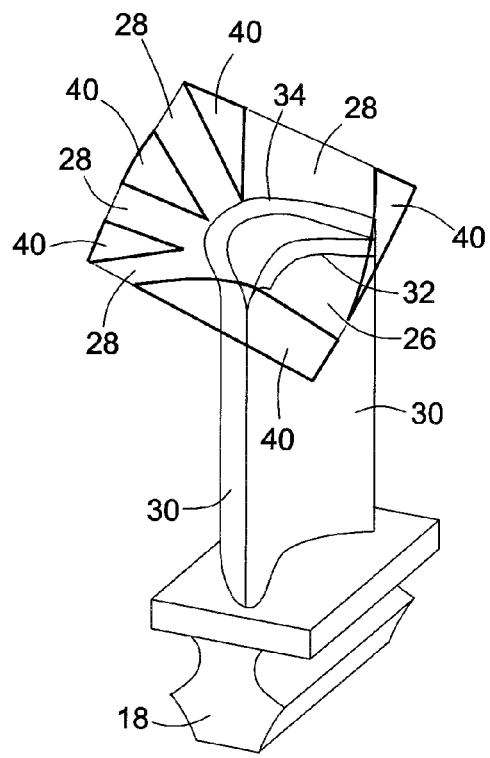

As represented in FIG. 2, one or more protective plies 36A are first assembled over the tip region of the blade 10 prior to folding plies 24, 26, and 28 or adding insert plies 36. Plies 36A are a ceramic matrix material preferably, though not necessarily, of the same as those for the plies 36. The plies 36A are reinforcement-free and serve to avoid the exposure of reinforcement fibers at the radially inward surface of the shroud 20 at the completion of the fabrication process. While plies 36A are described herein as providing environmental protection to the plies 24, 26, 28, and 36, other methods of achieving this result are foreseeable. For example, the reinforcement-free plies 30 that define the concave and convex surfaces 32 and 34 of the airfoil 16 could continue to the tip region of the blade 10 and also be folded away from the core plies 24 so as to be oriented transverse to the span-wise direction of the airfoil 16. While various approaches could be taken to produce the configuration of the folded plies 26 and 28, FIGS. 3 and 4 represent a particular process in which the plies 28 are split prior to being folded in order to accommodate the curvature of the convex surface 34. On the other hand, edges of the plies 26 are trimmed to avoid buckling that would otherwise occur due to the curvature of the concave surface 32. For clarity, the interior plies 24, 26 and 28 are omitted in FIGS. 3 and 4. Also omitted in FIGS. 3 and 4 is tooling that would be used to initially impart the desired orientation and shape to the plies 26 and 28, and thereafter support the interior plies 26 and 28 as they undergo the folding operation.

After folding, the shapes and sizes of the plies 26 and 28 cause them to be distributed within the shroud 20. As a result of this particular process of folding, the distribution of folded plies 26 and 28 around the perimeter of the airfoil 16 would result in the shroud 20 having a nonuniform thickness. Accordingly, the insert plies 36 can be sized, shaped and positioned in a manner that compensates for some of the unevenness that would result if the shroud 20 were to be constructed of only the folded plies 26 and 28. As shown in FIGS. 3 and 4, additional insert ply sections 40 are sized and shaped to fill the remaining voids in the shroud 20 between the trimmed portions of plies 26 and the split portions of plies 28. The reinforcement material and ceramic matrix material of sections 40 are preferably, though not necessarily, the same as those for the plies 36.

Figure 5:
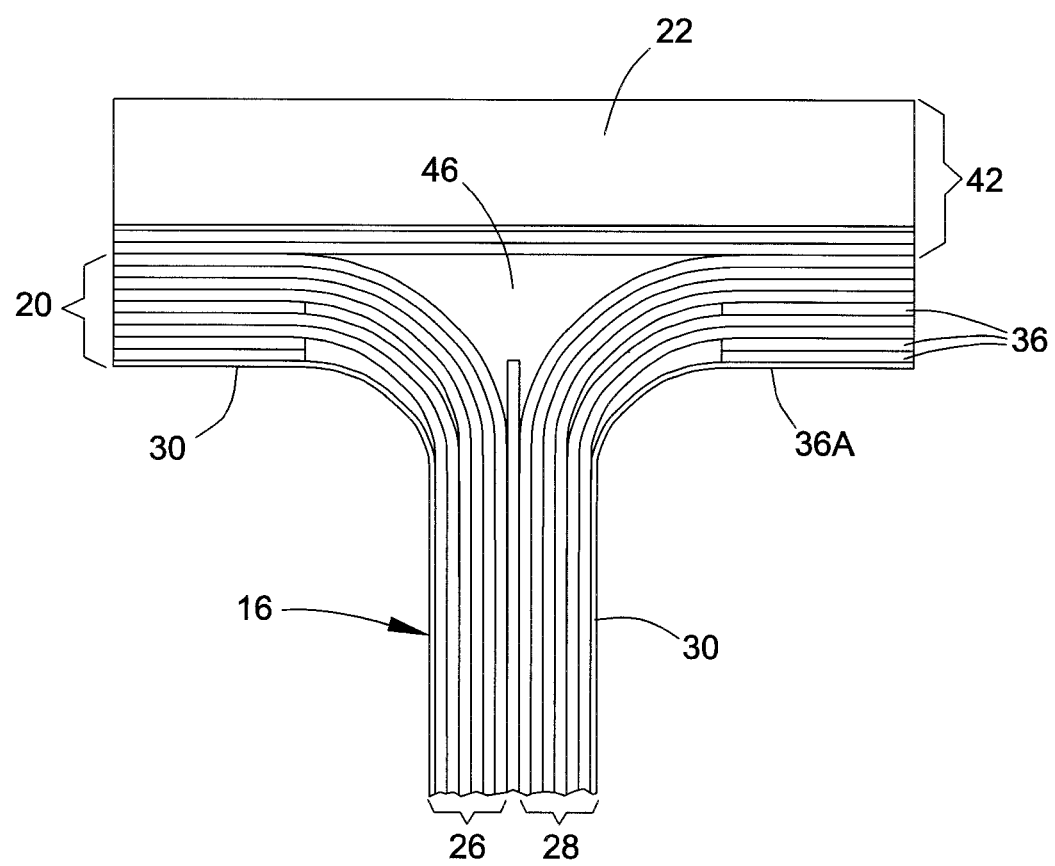
FIG. 5 represents a section of an integral tip shroud of a turbine blade taken through the spanwise direction near the mid chordwise span of the blade to show in more detail an interior laminate structure that results from interleaving prepreg layer inserts with prepreg layers within the airfoil during fabrication of the tip shroud.

FIG. 5 provides another view of the construction of the shroud 20 and its interleaved plies 26, 28 and 36. Represented as a section taken through the span-wise direction of the blade 10 near its mid chord-wise span, FIG. 5 shows an interior laminate structure of the shroud 20 resulting from an interleaving technique. In particular, FIG. 5 shows the core plies 24 (only one of which is shown), the plies 26 and 28 interleaved with the insert plies 36, and the reinforcement-free plies 36A following consolidation to form a laminate preform that, upon firing, will yield the tip shroud 20. Voids within the shroud 20, including voids between interleaved plies 26, 28 and 36 as well as a relatively larger void 46, can be filled during an infiltration process of a type employed with CMC processes. As evident from FIG. 5, the resulting shroud 20 is a fully integral portion of the airfoil 16, as opposed to a structure that is separately fabricated and then subsequently attached to the airfoil 16.

Figures 6, 7:
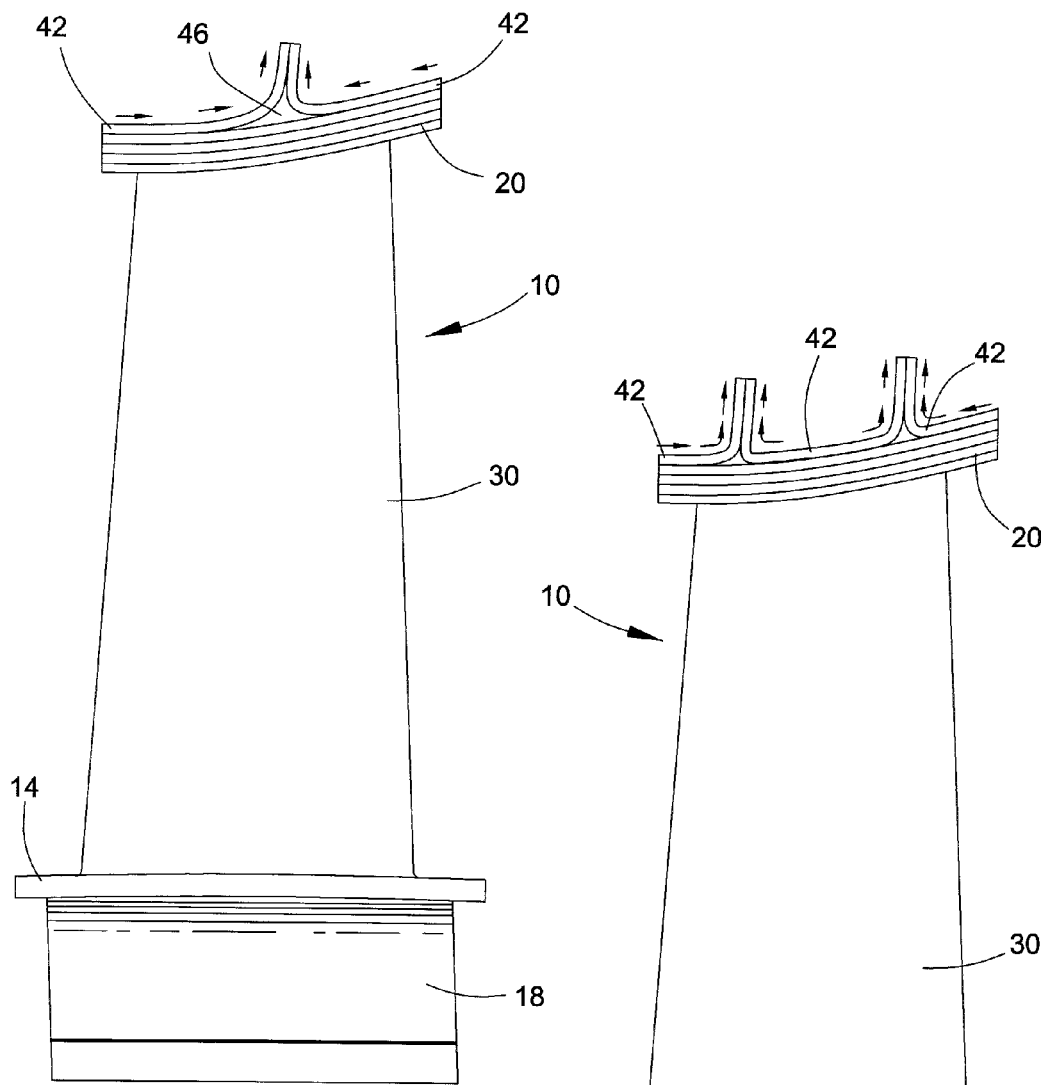
FIG. 6 is a view looking from either the convex or concave side of a turbine blade formed of a CMC material and shows the blade equipped with an integral shroud and integral seal tooth in accordance with an embodiment of the present invention.
FIG. 7 is a view looking from either the convex or concave side of a turbine blade formed of a CMC material and shows the blade equipped with an integral shroud and two integral seal teeth in accordance with another embodiment of the invention.

FIG. 5 further represents the presence of a seal tooth 22 incorporated into the tip shroud 20. FIG. 6 represents a view taken from either the concave 32 or convex 34 side of the airfoil 16 and depicts a process suitable for constructing and attaching the seal tooth 22 to the tip shroud 20 fabricated in the preceding steps. To fabricate the seal tooth 22 in FIG. 6, prepreg plies 42 are represented as being laid-up and deformed so that first portions of the plies 42 conform to an outermost surface of the shroud 20 and second portions of the plies 42 are folded so as to be transverse to the shroud 20 and aligned with the airfoil 16 to form the tooth 22. FIG. 6 further represents the use of an insert 46 that has been sized and shaped to fill a void created as a result of the assembly of plies 42 to form the seal tooth 22. As with the reinforcement-free plies 30 that define the concave and convex surfaces 32 and 34 of the airfoil 16 and the radially inward surface of the shroud 20, at least the outermost plies 42 are preferably fabricated to be free of reinforcement material so that fibers will not be exposed at the outer surfaces of the seal tooth 22 at the completion of the fabrication process. The innermost plies 42 preferably contain reinforcement material for the purpose of increasing the strength of the seal tooth 22. Although the above description describes the airfoil 16 as comprising only one seal tooth 22, it is within the scope of the invention to have multiple seal teeth 22 incorporated into the tip shroud 20 of the airfoil 16. For example, FIG. 7 represents an embodiment of the present invention with two seal teeth 22 on the tip shroud 20 of the airfoil 16.

As understood in the art, in addition to constructing the tip shroud 20 and seal tooth 22 of a desired number of prepreg plies 24, 26, 28, 30, 36, 36A, and 42, the plies 24, 26, 28, 36, 36A, and 42 can be laid-up to achieve a desirable orientation scheme to promote the mechanical properties of the airfoil 16, shroud 20 and seal tooth 22. As a particular example, in embodiments in which the prepreg plies 24, 26, 28 and 36 used to form the shroud 20 contain unidirectional-aligned continuous reinforcement materials (for example, unidirectional tows and/or fibers), the plies 24, 26, and 28 can have different fiber orientations. In a particular example, the plies 24 can be laid up so that their unidirectional reinforcement material is oriented in the span-wise direction of the blade 10, coinciding with the radial direction of a turbine in which the blade 10 will be installed. This may also be true for a majority of plies 26 and 28. Furthermore, where more than one ply 26 or 28 is folded as a group together and/or more than one insert ply 36 is interleaved as a group (as shown in FIG. 5), the individual plies 26, 28 or 36 within a particular group may have different reinforcement orientations. The same can be done with the plies 42 that form the seal tooth 22. Reinforcement orientations other than 0 and 90 degrees are foreseeable.

To complete the manufacturing of the blade 10 and its tip shroud 20, the laid-up prepreg plies 24, 26, 28, 30, 36, 36A, and 42 are preferably debulked prior to undergoing curing, followed by firing during which binders are burned-off and the ceramic precursor is converted to the desired ceramic matrix material for the reinforcement material. Suitable debulking, curing and firing processes, as well as any additional processes necessary to achieve the final desired shape and properties of the blade 10, are known in the art and therefore will not be described further.

While the invention has been described in terms of specific embodiments, it is apparent that other forms could be adopted by one skilled in the art. Therefore, the scope of the invention is to be limited only by the following claims.

The invention claimed is:

1. A process for producing a component comprising a first region, and at least a second region having at least one off-axis geometric feature that results in the second region having more complex geometries than the first region, the process comprising:
    forming the first region of the component with plies containing a reinforcement material in a precursor of a ceramic material, the plies comprising at least a first set of plies between at least second and third sets of plies;
    splitting and/or trimming at least some of the plies of the second and third sets of plies thereby introducing voids in the second region;
    folding distal portions of the second and third sets of plies away from the first set of plies so that the folded distal portions of each of the second and third sets of plies are oriented transverse to the first set of plies within the first region of the component;
    filling the voids in the second region between split portions and/or adjacent trimmed portions of the second and third sets of plies with additional insert ply sections sized and shaped to fill the voids;
    interleaving plies of a fourth set of plies among at least some of the folded distal portions of the second set of plies and among at least some of the folded distal portions of the third set of plies; and then
    consolidating and curing the first, second, third, and fourth sets of plies so that the first set of plies and portions of the second and third sets of plies that were not folded away from the first set of plies define the first region of the component, and so that the folded distal portions of the second and third sets of plies and the fourth set of plies interleaved therewith define the second region of the component.

2. The process according to claim 1, wherein the component is produced to further comprise at least a third region on the component formed with a fifth set of plies prior to consolidating and curing the first, second, third, and fourth sets of plies, the process further comprising:
    forming the fifth set of plies to contain reinforcement material in a precursor of a ceramic material;
    applying the fifth set of plies to a surface of the second region of the component defined by the folded distal portions of the second and third sets of plies and the fourth set of plies interleaved therewith, the fifth set of plies being folded to have first portions that overlie the folded distal portions of each of the second and third sets of plies and to have second portions that are aligned with the first region and oriented transverse to the folded distal portions of the second and third sets of plies.

3. The process according to claim 2, further comprising filling a void defined by and between the second region of the component formed by the folded distal portions of the second and third sets of plies and the third region of the component formed by the first and second portions of the fifth set of plies.

4. The process according to claim 1, wherein the first region of the component further comprises at least one set of reinforcement-free plies that overlie surfaces of the first region of the component defined by outermost plies of the second and third sets of plies, the reinforcement-free plies not comprising the reinforcement material present in the second and third sets of plies.

5. The process according to claim 4, further comprising folding distal portions of the reinforcement-free plies away from the first set of the plies of the first region so that the folded distal portions of the reinforcement-free plies are oriented transverse to the first set of plies and overlie an outermost surface of the second region of the component defined by the folded distal portions of the second and third sets of plies and the fourth set of plies interleaved therewith.

6. The process according to claim 1, further comprising at least one set of protective plies overlying an outermost surface of the second region of the component defined by the folded distal portions of the second and third sets of plies and the fourth set of plies interleaved therewith, the protective plies not comprising the reinforcement material present in the second and third sets of plies.

7. The process according to claim 1, wherein distal portions of the first set of plies are folded in the same orientation as the second set of plies, the third set of plies, or a combination thereof.

8. The process according to claim 1, wherein the fourth set of plies comprise an opening corresponding in size and shape to an outer peripheral shape defined by the first region of the component.

9. The process according to claim 1, wherein the second and third sets of plies are formed to define a concave surface and a convex surface on the first region of the component.

10. The process according to claim 1, wherein the first, second, third, and fourth sets of plies are prepreg plies formed by a prepreg process comprising melt-infiltration of a fabric material.

11. The process according to claim 1, wherein the component is an airfoil component, the first region of the airfoil component is an airfoil, and the second region of the airfoil component is a tip shroud.

12. A process for producing a turbine blade comprising an airfoil, a tip shroud, and at least one seal tooth, the tip shroud having at least one off-axis geometric feature that results in the tip shroud having a more complex geometry than the airfoil, the process comprising:
    forming the airfoil of the turbine blade with plies containing a reinforcement material in a precursor of a ceramic material, the plies comprising at least a first set of plies between at least second and third sets of plies;
    splitting and/or trimming at least some of the plies of the second and third sets of plies thereby introducing voids;
    folding distal portions of the second and third sets of plies away from the first set of plies so that the folded distal portions of each of the second and third sets of plies are oriented transverse to the first set of plies within the airfoil of the component;
    filling the voids in the tip shroud between split portions and/or adjacent trimmed portions of the second and third sets of plies with additional insert ply sections sized and shaped to fill the voids;
    interleaving plies of a fourth set of plies among the folded distal portions of the second set of plies and among the folded distal portions of the third set of plies;
    forming at least the seal tooth of the turbine blade with a fifth set of plies containing reinforcement material in a precursor of a ceramic material, the fifth set of plies being applied to a surface defined by the folded distal portions of the second and third sets of plies and the fourth set of plies interleaved therewith, the fifth set of plies being folded to have first portions that overlie the folded distal portions of each of the second and third sets of plies and to have second portions that are aligned with the airfoil and are oriented transverse to the folded distal portions of the second and third sets of plies; and then
    consolidating and curing the first, second, third, fourth and fifth sets of plies so that the first set of plies and the portions of the second and third sets of plies that were not folded away from the first set of plies define the airfoil of the turbine blade, so that the folded distal portions of the second and third sets of plies and the fourth set of plies interleaved therewith define the tip shroud of the turbine blade, and so that the fifth set of plies define the seal tooth of the turbine blade.

13. The process according to claim 12, wherein the airfoil of the turbine blade further comprises at least one set of reinforcement-free plies that overlie surfaces of the airfoil of the turbine blade defined by outermost plies of the second and third sets of plies, the reinforcement-free plies not comprising the reinforcement material present in the second and third sets of plies.

14. The process according to claim 13, further comprising folding distal portions of the reinforcement-free plies away from the first set of the plies of the airfoil so that the folded distal portions of the reinforcement-free plies are oriented transverse to the first set of plies and overlie an outermost surface of the tip shroud of the turbine blade defined by the folded distal portions of the second and third sets of plies and the fourth set of plies interleaved therewith.

15. The process according to claim 12, further comprising at least one set of protective plies overlying an outermost surface of the tip shroud of the turbine blade defined by the folded distal portions of the second and third sets of plies and the fourth set of plies interleaved therewith, the protective plies not comprising the reinforcement material present in the second and third sets of plies.

16. The process according to claim 1, wherein the component is a CFCC.

17. The process according to claim 1, wherein the component is selected from the group consisting of shroud, combustor liner, vane, nozzle, blade, and bucket.

18. The process according to claim 1, wherein the component is a low pressure turbine blade.

19. The process according to claim 1, wherein the ceramic material comprises silicon.

20. The process according to claim 1, wherein the reinforcement material is selected from the group consisting of short fibers, continuous fibers, fiber bundles, or a combination thereof.

21. The process according to claim 1, wherein the reinforcement material is selected from the group consisting of silicon carbide, titanium carbide, silicon nitride, alumina, or a combination thereof.

22. The process according to claim 1, wherein the reinforcement material and precursor comprise silicon carbide.

* * * * *